United States Patent [19]

Vinberg et al.

[11] Patent Number: 4,800,510

[45] Date of Patent: Jan. 24, 1989

[54] METHOD AND SYSTEM FOR PROGRAMMED CONTROL OF COMPUTER GENERATED GRAPHICS LAYOUT

[75] Inventors: Anders B. Vinberg, Del Mar; Kenneth W. Colby, San Diego, both of Calif.

[73] Assignee: Computer Associates International, Inc., Garden City, N.Y.

[21] Appl. No.: 761,182

[22] Filed: Jul. 31, 1985

[51] Int. Cl.[4] .................. G06F 15/62; G06F 3/14; G06F 3/037
[52] U.S. Cl. .................................. 364/521; 340/703; 340/721; 364/520
[58] Field of Search ................ 364/518–523; 340/700, 701, 703, 713, 714, 721, 723–724, 734

[56] References Cited

U.S. PATENT DOCUMENTS

| | | | |
|---|---|---|---|
| 4,121,283 | 10/1978 | Walker | 364/200 |
| 4,232,311 | 11/1980 | Agneta | 340/701 |
| 4,254,409 | 3/1981 | Busby | 340/723 |
| 4,471,465 | 9/1984 | Mayer et al. | 340/701 |
| 4,555,775 | 11/1985 | Pike | 364/900 |
| 4,559,533 | 12/1985 | Bass et al. | 340/724 |
| 4,594,674 | 6/1986 | Boulia et al. | 364/523 |
| 4,611,306 | 9/1986 | Crehan et al. | 364/521 |
| 4,616,327 | 10/1986 | Rosewarne et al. | 364/518 |
| 4,665,555 | 5/1987 | Alker et al. | 340/731 |

FOREIGN PATENT DOCUMENTS

| | | | |
|---|---|---|---|
| 8200726 | 3/1982 | PCT Int'l Appl. | 340/703 |
| 2116005 | 9/1983 | United Kingdom | 364/521 |

*Primary Examiner*—Felix D. Gruber
*Attorney, Agent, or Firm*—Davis Hoxie Faithfull & Hapgood

[57] ABSTRACT

A method and system providing high-level control of the layout of computer-generated graphs which adjusts detail design parameters specifying layout attributes of a graph. The adjustments are done automatically in response to values of design control parameters selected by a user to effect choices made by the user regarding the layout design of a graph. For a graph being designed, the selected design control parameter values control the selection, from tabularized groups of graph detail design parameters, of specific detail design parameter values. The selected graph detail design parameter values are provided to a graph production process to enable it to control an output device used in producing a graph which is laid out according to the user's choices.

14 Claims, 10 Drawing Sheets

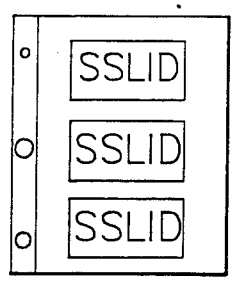
FIG. 6E
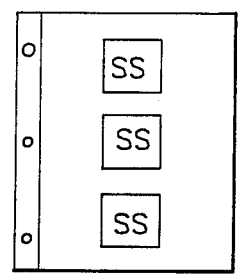
FIG. 6F
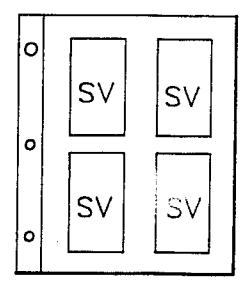
FIG. 6G
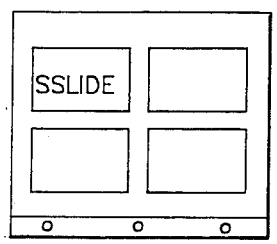
FIG. 6H
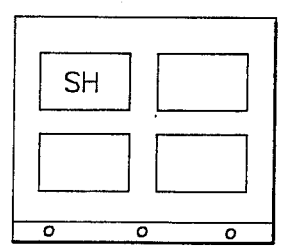
FIG. 6I
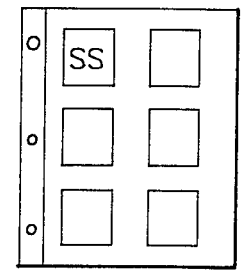
FIG. 6J
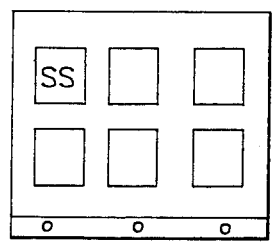
FIG. 6K
FIG. 7A
FIG. 7B

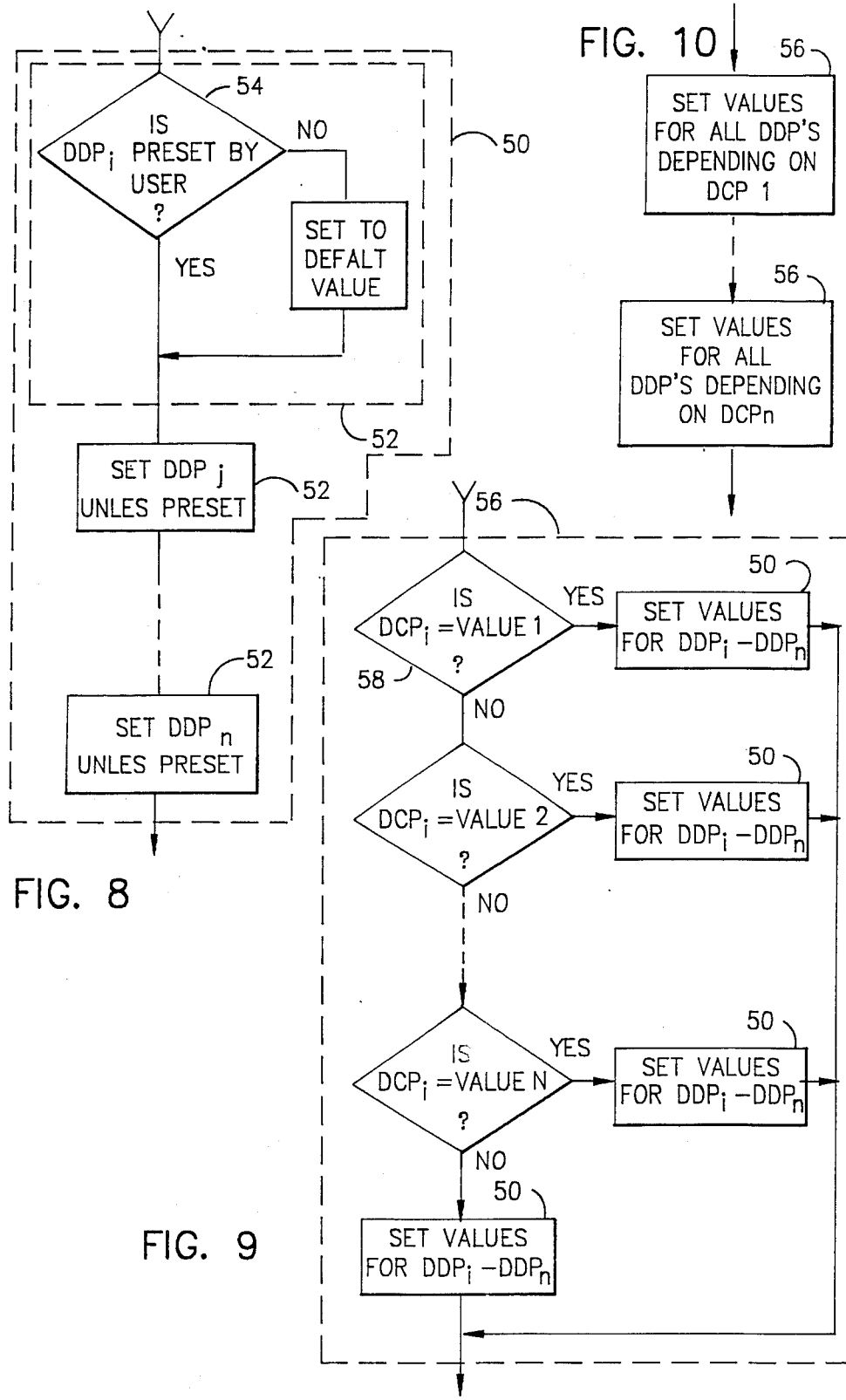

METHOD AND SYSTEM FOR PROGRAMMED CONTROL OF COMPUTER GENERATED GRAPHICS LAYOUT

BACKGROUND OF THE INVENTION

This invention relates to a new method and means for controlling the process of designing the layout of a computer-generated graph. More specifically, it relates to automatic adjustment of layout-determining graph detail design parameter values in response to a complement of design control parameter values that are selectively entered by a user at a relatively high level of abstraction in a computer-generated graphics system.

In prior art graphics systems, graphics hardware and software permit a highly skilled user to produce graphs of high quality. However, in the hands of a user having no skill in the design of graphs or in the use and manipulation of graphics software and hardware, graph design usually results from a series of predetermined default assumptions made by the graphics system once a user indicates to the system an output device, the type of graph to be produced on the device and the data the graph is to display. The default assumptions controlling the basic graph design are then determined according to the selected device and graph type.

The detail design parameter values assembled by the design default assumptions are the set of values specifying all attributes of a graph that may be adjusted. Such detail design parameters include (but are not limited to) the color, background color, character size, type style, location, and angle of every piece of text annotating the graph (e.g. title, x- and y-axis legends, explanatory texts); the color, thickness, texture (dot-and-dash pattern), length, and location of every line; the color, pattern, background color and outline color of every polygon; and other specifics such as protected (blanked) areas, and axis scaling.

For example, in FIG. 1, a page 6 has three graphs 7-9 that present different aspects of an organization's financial profile. Among the detail design parameter values of interest in the design of the page 6 are those which affect the overall layout of the page such as its aspect ratio, its height and width, the position and dimensions of the page title, whether dimensions on the page are to be in inches or centimeters, the dimensions of a margin provided at the top of the page for the holes used to bind the page in a report, the thickness of lines used to draw the frames of the graphs 714 -9, and so on.

For each of the graphs 714 -9, detail design parameter values of interest include the origin, length, and height of the X and Y axes in the bar chart 7 and the line graph 9, the center and radius of the circle in the pie chart 8, the position and dimensions of the graph titles and annotations, thickness and texture of the lines used to draw curves and polygons, the positions of the graphs on the page, the sequence, shades, and textures of the colors used in the background, polygons, lines, pie slices, and bars used in the graphs, and the drawing order of the graphs.

The graph designer is also interested in affecting detail design parameter values determining type and style of text used at all titles, legends, messages, and annotations on the page or in the graphs.

Because a graph is often intended to be used for particular or unique circumstances, the detail design parameter values selected by default may be inadequate to produce a graph suited to the circumstances. In such cases, the user must intervene and modify the default graph design. To produce a graph better suited to its intended use and to the output device producing it than the default graph, the user must specify the detail design parameter values for all the details that should differ from the default assumptions provided by the system. The details to be changed may be very numerous, making the custom design effort a large task. It is also a task that requires a user having substantial graphical skills.

The principal reason that custom graph design in prior art systems requires so much skill and time of the user is that detail graph design parameters are accessible only at a lower level of system abstraction than the data to be graphed. Often, to fully control the design parameters of a graph, a skilled used must manipulate graphical primitives such as line segments, polygons, etc. Becuase these parameters are accessible only at a low level of abstraction, the user must deal with a large volume of information, making specification on this level a burdensome task.

SUMMARY OF THE INVENTION

This invention provides a method and means for automatically determining the layout of a graph which is to be produced by a system including a plurality of graphical output devices, a computer-implemented graphics process for operating an output device in response to specification of an output device and designation of a type of graph to be produced, a storage device accessible to the graphics process, and entry means for providing user-entered graph design parameters and data to the graphics process.

In the invention, predetermined groups of detail design parameter values are stored in the storage device, with each group related to a predetermined graph design control parameter. User-designated design control parameter values are received through the entry means and graph detail design parameter values are selected from the predetermined groups stored in the storage device, with the selection based upon the designated design control parameter values. The selected graph detail design parameter values are provided to a graph production process to enable the production process to control the selected output device in producing, on a graph presentation medium, a graph whose layout is based upon the provided detail design parameters.

It is therefore a principal objective of the present invention to permit selective high-level control of graph layout design in a computer-implemented graphics process.

An advantage of the invention over the prior art is that provision of high-level control of graph layout design affords the flexibility to design a customized graph while dealing with a small set of design control parameters, which reduces the design time and skill level required to design the graph.

Other objects and attendant advantages of the invention will become apparent when the following detailed description is read in light of the below-described drawings.

BRIEF DESCRIPTION OF THE DRAWINGS

FIGS. 6A-6J illustrate report pages with graph layouts corresponding to respective SUBLAYOUT control parameter values.

FIGS. 7A and 7B represent lookup table layouts for storing graph detail design parameter values for use by the method of the invention.

FIG. 8 is a flow diagram fragment used for setting a group of detail design parameters to their default values.

FIG. 9 is a flow diagram fragment incorporating the FIG. 8 fragment and illustrating the setting of default values for a group of detail design parameters dependent on one design control parameter.

FIG. 10 illustrates how the method of the invention concatenates the flow diagram of FIG. 9 to set default values for a set of detail design parameters based upon selection of values for a group of design control parameters assuming no detail design parameters depend upon more than one design control parameter.

DETAILED DESCRIPTION OF THE INVENTION OPERATIONAL ENVIRONMENT

Figure 2:
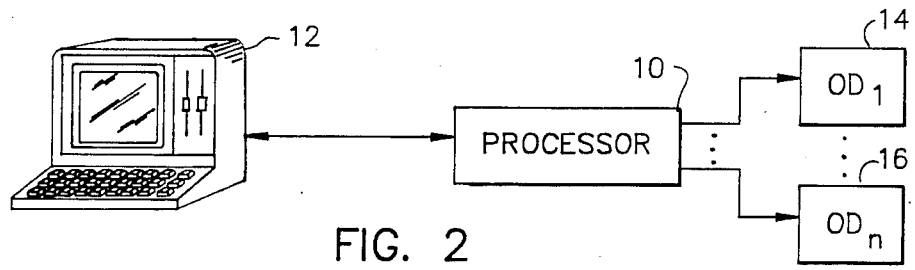
FIG. 2 is a block diagram of a system hardware environment in which the invention is intended to be used.

The block diagram of FIG. 2 summarizes a conventional complement of hardware utilized in a graphics system and constituting the operational environment of the invention. A conventional processor 10 includes software and data storage, neither shown, that implement graphics application and production programs (processes), which together respond to commands, parameters and data received from a data entry and monitor apparatus 12 to produce graphs on one or more output devices including output devices 14 (OD$_1$) through 16 (OD$_N$).

The data entry and monitor apparatus 12 is conventional; preferably data entry is made through a typical alphanumeric keyboard, from which commands, parameters, and data are sent to the application and graphics processes in the processor 10. It is understood that other methods of data entry such as graphical pointing devices (cursor, mouse, etc.) may also be employed. The monitor portion of the apparatus 12 includes a CRT display that permits a user to interact with the processes in the processor 10 by displaying function menus, requests for action or information, and other prompts generated by the processes as well as representations of a user's selection of menu items and parameter values.

The graphics design application and graphics production programs in the processor 10 of FIG. 2 permit a user to design and produce a graph. When used herein the term "graph" includes many kinds of synthesized pictorial representations that have one or more symbols. As is known, graphs include but are not limited to line charts, area charts, scattergrams, horizontal and vertical bar charts, pie charts, maps, tables and other text displays, lists, and symbol diagrams, and combinations of these.

Figure 3A:
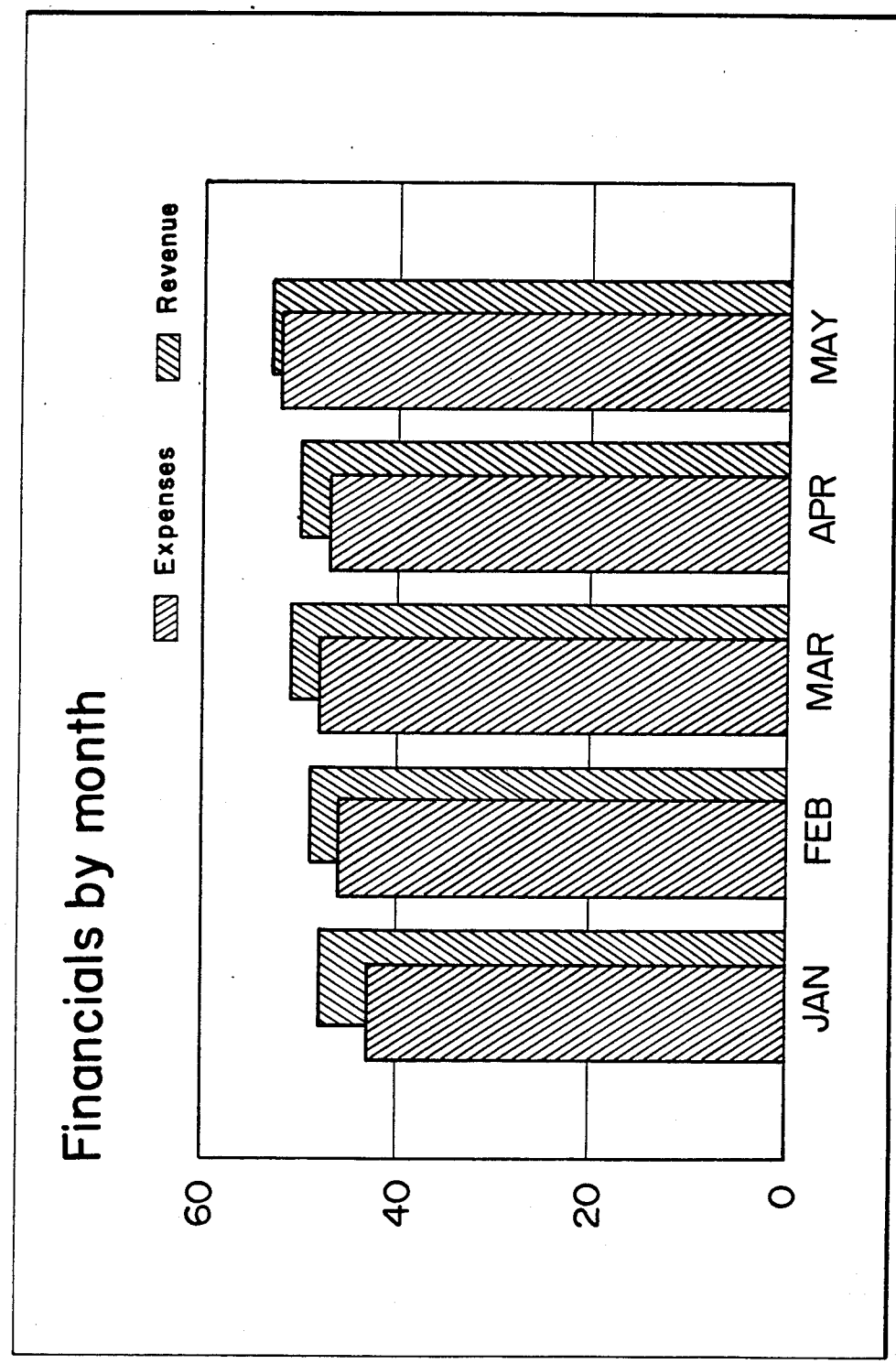
FIGS. 3A and 3B illustrate a representative graph embodied in a pair of different graph layouts intended for different uses.
Figure 3B:
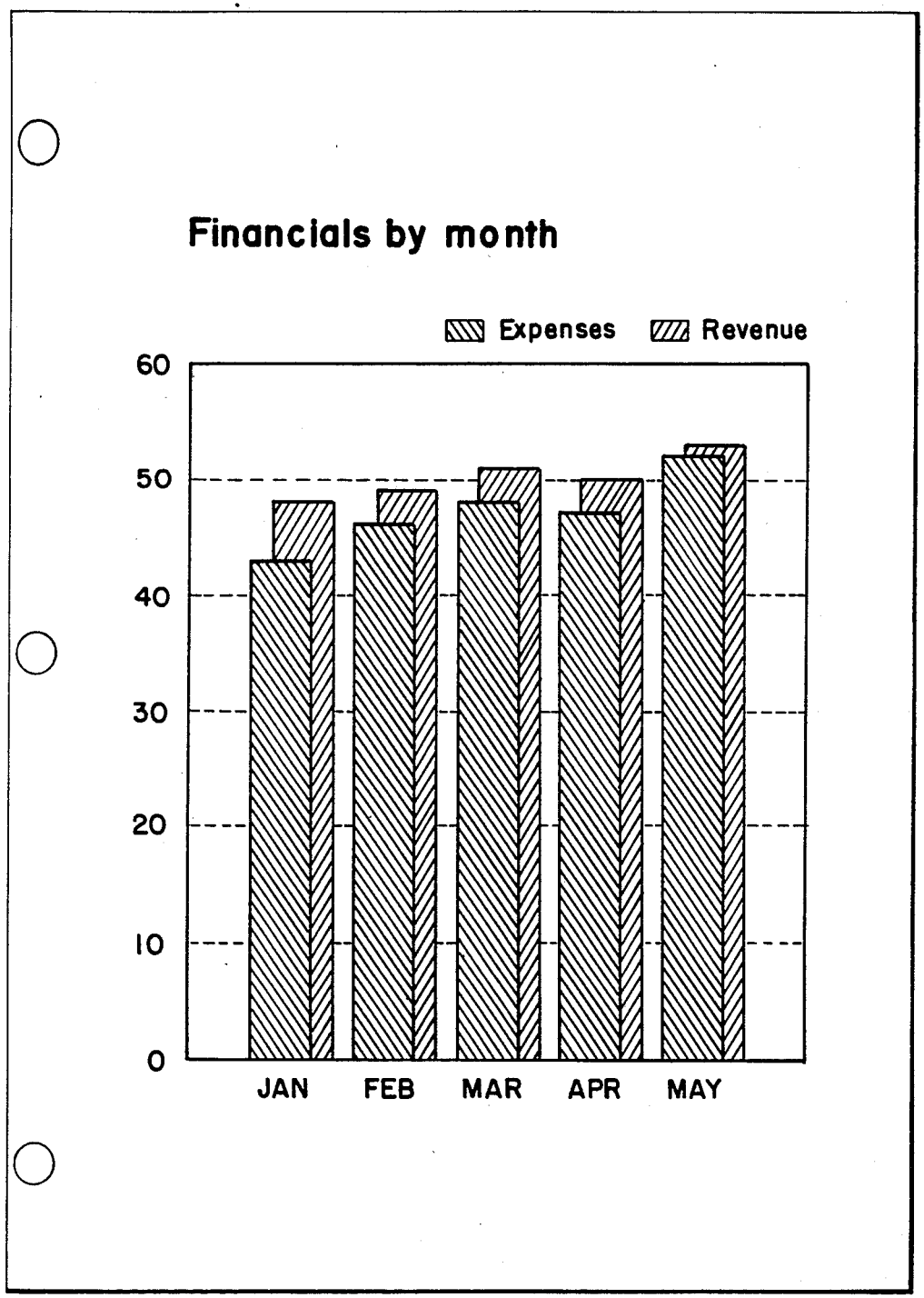

The design of a good graph should adapt the graph to the characteristics and limitations of the output device used to produce it and to the intended use of the graph. It is not possible to design by default a graph that is attractive and effective in all circumstances. A skilled draftsman will draw the same chart very differently for a report illustration, for viewing on a computer terminal screen, presentation slide, view graph, or poster. FIGS. 3A and 3B illustrate two graphs presenting precisely identical data with, however, significantly different layouts. The first graph (FIG. 3A) is appropriate for use in a slide presentation. It has a simple layout with large hold annotation and a horizontal, very elongated page format. In fact, the first graph presented on 35 millimeter film would have a format 36×24 millimeters.

In contrast, the second graph (FIG. 3B) has a vertical layout that is appropriate for inclusion in a bound report. Its page format would characteristically be 8.5 inches×11 inches (8.5×11) with margins provided for binding and pagination.

In addition to the layouts of the graphs of FIGS. 3A and 3B a graph draftsman will also consider what level of quality in draftsmanship should be invested in characteristics such as text type style, line weight and line texture. Further, the draftsman's judgment would determine whether to use device-generated text or to omit text and replace it by an outline.

The draftsman must also consider the style and appearance of the graph to insure effective conveyance of the message. This involves taking the psychology of the intended audience into account and it includes the selection of a color scheme and shading.

Other miscellaneous environmental considerations also must be addressed when preparing graphs. These considerations include conventions that control how graphs should be drawn. These conventions may be local (corporate drawing standards), dependent upon the intended use (standards for publications in certain journals, standards of acceptable reporting formats by regulatory agencies), or national (inches or millimeters).

Finally, the skilled graph draftsman will understand that different graph types have little in common, and that parameters specifying graph design may be altogether different for, for example, a pie chart and a table. However, some graph types may have some parameters in common, such as axis drawing and scaling parameters of line charts and bar charts. Even totally unrelated graph types such as pie charts and tables often have some parameters in common having to do with annotation, overall page layout, and color choices.

Prior art systems are aware of graph type, and represent the data accordingly. However, prior art systems do not consider the graph type to be a general parameter which controls the graph layout design, with potential impact on many detailed design decisions.

Figure 4:
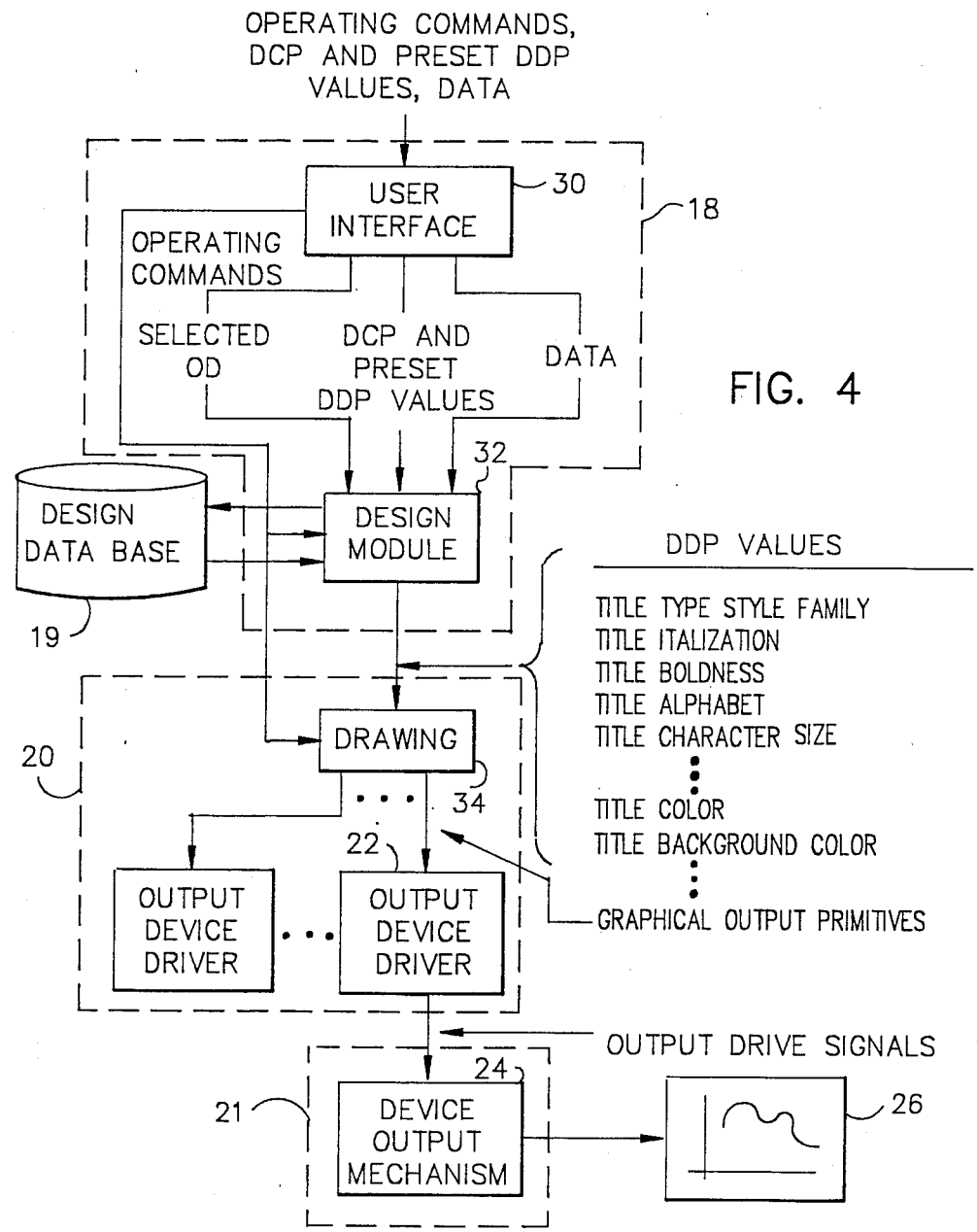
FIG. 4 is a functional block diagram of a graph design application process including the method of the invention and connected to a graphics production process.

With reference now to FIG. 4, the actual process of graph design according to the invention is implemented in a graphics design application process 18, which responds to commands, graph design control parameters, specified values for particular detail design parameters, and data provided by a user to establish the specific characteristics of a graph layout. When used herein the term "design control parameter" (DCP) is taken to mean a parameter having a value that is selectable by a user for determining the value of at least one preassociated detail design parameter (DDP). The process 18 draws on graph detail design parameter values stored in a database module 19. Exemplary of such a module is a magnetic disk storage device which can be used to store graph design values.

The detail design parameter values chosen by the application process 18 are fed, in code form, to a conventional graph production process 20. The process 20 converts the coded detail parameter values to drive signals having a form that is understood by the selected graph output device, such as the device 21. The drive signals actually control the mechanism in the selected output device that produces the desired graph. The graph detail design values are converted by the graph production process into graphical output primitives that are used in driving the selected output device. As is known, graphical output primitives consist of process-generated commands indicating lines, polygons, colors, text, starting and ending coordinates, segments, windows, and viewports.

The graphics process 20 is preferably an output device independent entity that communicates with the process 18 in a single language construct that is not affected by the user's choice of output device.

A generic, device-independent graph production process that is included in a graph design application program and which produces graphical output primitives for driving more than one output device is described in Chapter 4 of *Fundamentals of Interactive Computer Graphics*, by Foley and Van Dam, Addison-Wesley, 1984.

The graphics process 20 includes an output device driver for each output device driven by the system. A device driver 22 is shown for driving the device 21. In many cases a driver such as the driver 22 will consist of a device processing unit or process that responds to graphical output primitives by producing the drive signals for physically controlling the output mechanism 24 of the device 21. Such drive signals define position and movement of the mechanism 24 to create points, lines, figures, text, and numbers. For certain output devices, the drive signals also cause the mechanism 24 to color and shade objects and areas on the graph produced.

An installation of a display processing unit for driving a CRT is described in detail in the Foley and Van Dam reference at pages 112-137.

The physical control exercised over the output mechanism 24 causes the mechanism to produce on an output medium a graph 26 that presents data entered by a user in a graphical format having a design resulting from the commands and data that were provided to the application program 18.

Typical output devices used in the production of graphs include video terminal screens (CRT's), pen plotters, impact printers, nonimpact printers, and slide recorders. The graphs are produced on media including video terminal screens and sheets of paper, viewgraphs or slide transparencies.

Returning to the application process 18 of FIG. 4, the determination of graph layout begins with commands and data fed through a conventional user interface module 30 which translates and stages commands, parameters, and data input by a user into the application process 18. In addition, the interface module 30 provides responses and prompts from the application process 18 to assist and guide the user in execution of the graphical design process 18.

The information supplied by way of the module 30 may take many forms: some current graphics systems have a programming language user interface, requiring a program to be written and information to be supplied as parameters in subroutine calls (e.g. ISSCOs's DISSPLA, IBM's PGF); others have a unique command language, either very rigid or flexible and similar to natural English (e.g. ISSCO's TELLAGRAF); others use a prompting user interface, engaging the user in a question and answer dialog with menus of choices (e.g. ISSCO's CUECHART); others use a screen oriented user interface, requiring the user to fill in the blanks on the screen and use special function keys to control the operation of the system (e.g. ISSCO's IVISS MANAGER, IBM'S ICU); others let the user control the operation of the system through the use of an interactive pointing device, a "mouse" (e.g. Apple's Lisa-Graph).

In the invention, specifications input by a user to indicate an output device, DCP values, and, if desired, preset values for selected DDP's are translated in typical fashion by the user interface module 30 and are fed together with graph data to a graph design module 32. The graph design module 32 responds to the selected output device, and design parameter values input by the user to access the detail design value database 19. The data obtained by the design module 32 from the database 19 is essentially a list of detail design parameter values (specific design specifications) that completely characterize the layout of a graph to be produced by a selected output device.

It is known to provide an automatic function in the design module 32 to adapt the desired graph to the data. This function undertakes error recovery default action to automatically override DDP values if necessitated by the graph data. The most common example of this is to automatically scale an axis to fit the data and this is almost universally done in the prior art systems. Another, less common adaptation is to automatically shrink character size of text such as the title if more text has been provided than will fit in the title space allocated in the graph.

The detail design parameter values provided by the design module 32 can include up to 500 separate items. An example of some detail design parameters specifying just the title of a graph are shown in FIG. 4.

The values obtained and adapted by the design module 32 in the form of detail design parameter values are provided to a drawing module 34 in the graphics process 20, which conventionally translates the design values into the collection of graphic output primitives used to control the selected output device in the production of the desired graph.

Figure 5:
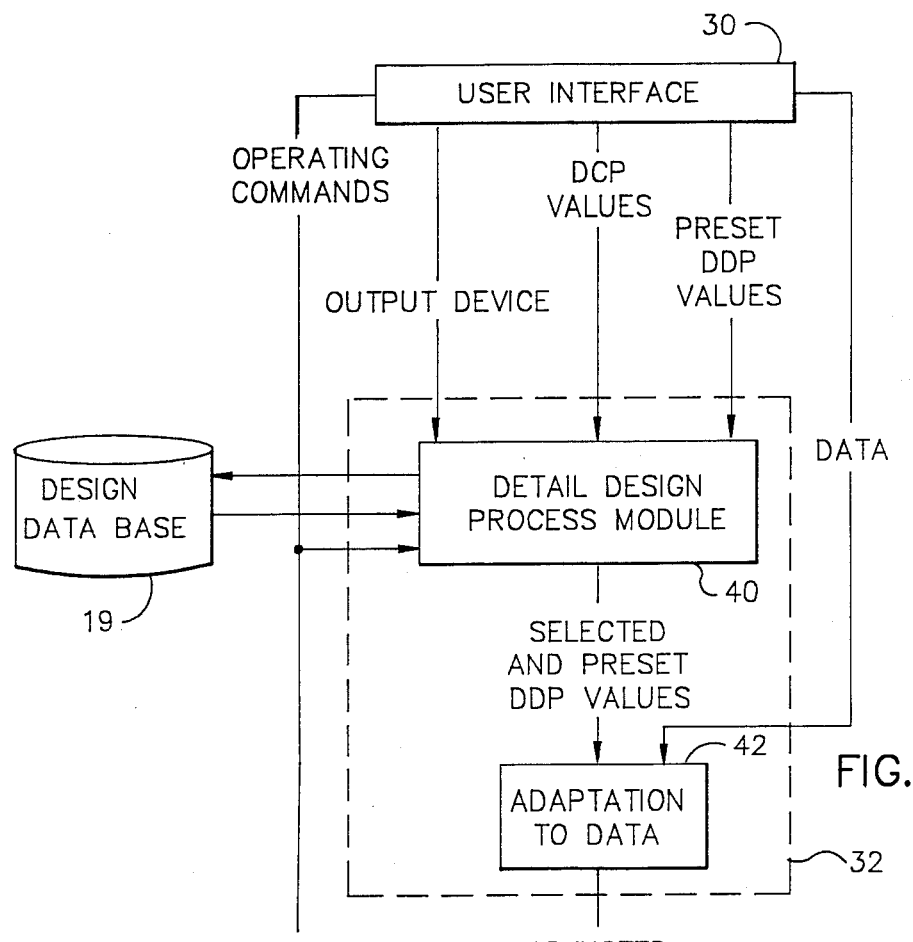
FIG. 5 is a more detailed diagram of the design module of FIG. 3, which implements the method of the invention.

With reference to FIG. 5, the relationship of the method of the invention to the design module 32 of FIG. 4 can be understood. In the method of the invention, the information entering the design module 32 includes specification of an output device (OD), DCP values designated by the user, and data to be represented in a graph. In addition, the method of the invention also accepts DDP values that have been preset by the user. As described below, the method preserves (flags) those preset DDP values during its design of a graph layout.

THE INVENTION

The method of the invention defines layout of a graph through selection of specific values for graph detail design parameters under control of design control parameter values set by the user. This is in contrast with prior art systems which define graph layout at a level corresponding to the design module 32 solely by a default beyond the ability of a user to control, save by specification of output device and graph type.

The method of the invention is embedded in detail design process module 40 that responds to one or more user-selected DCP values and user-preset DDP values received through the user interface (reference numeral 30 in FIG. 4). The detail design module 40 selects a full complement of DDP values completely specifying the layout of a graph to be produced; the non-specified DDP values are obtained from the design database 19 in response to the received DCP values. The module 40 provides the set of preset and selected detail design parameter values to a conventional module 42 that adapts the DDP values to the graph data to be presented.

In the method of the invention, the provision to the user of a set of choices of DCP values by the module 30 permits the user to specify, at the highest level of system abstraction, a set of design control parameters larger than the set of default selection parameters available in the prior art (output device and chart type). The set of DCP's made available to the user by the invention permits a leveraged manipulation of DDP values which does not require (but which does not necessarily exclude) direct determination of explicit DDP values by the user. Thus, the method of the invention permits the user to more easily determine the specifics of graph layout with fewer manipulations than the prior art.

To permit this higher level of manipulation, the method of the invention includes providing a user interface that affords the user the ability to enter values for graph design control parameters that are tabularized and discussed below.

Table I defines values for a LAYOUT DCP that correspond to final presentation media in which a graph is to be presented. For example, the value SLIDE corresponds to presentation of a graph on a 35 mm slide.

Each of the Table I values invokes a graph layout that has been determined to be particularly suited for the presentation medium corresponding to the value. Each of the predetermined layouts is specified by particular values of a set of predetermined detail design parameters including, but not limited to, layout aspect ratio, the origins, lengths, and heights of the X and Y axes, the horizontal and vertical positions and heights of the graph title in the axis legends, and the thicknesses of lines that define curves and frames of the graph.

For example, the value VREPH defines a single graph presented in standard vertically-oriented report format on an 8.5"×11" page (like the FIG. 3B graph). The curves and frame margins of the graph are drawn with high resolution strokes and the title and legends are located at predetermined positions on the vertically-oriented graph. The vertical orientation of the graph has an aspect ratio (height to width) that is defined with respect to the margins of the page on which the graph is to be produced such that the graph is placed at a predetermined location selected to enhance the quality of the graph layout.

Contrastingly, FIG. 3A illustrates a graph layout corresponding to the SLIDE value. Note that the SLIDE graph layout aspect ratio utilizes the full area of a 35 millimeter slide, which is typically wider than it is high. Thus, the FIG. 3A graph has been automatically adjusted to an aspect ratio in which width exceeds height, and in which text characters are positioned optimally for presentation in the report medium (35 mm slide) for which the layout was designed.

Table II lists values of a design control parameter SUBLAYOUT that is used primarily to produce report illustrations that are smaller than the full report page sizes associated with the VREP and HREP values of Table I.

Figure 1:
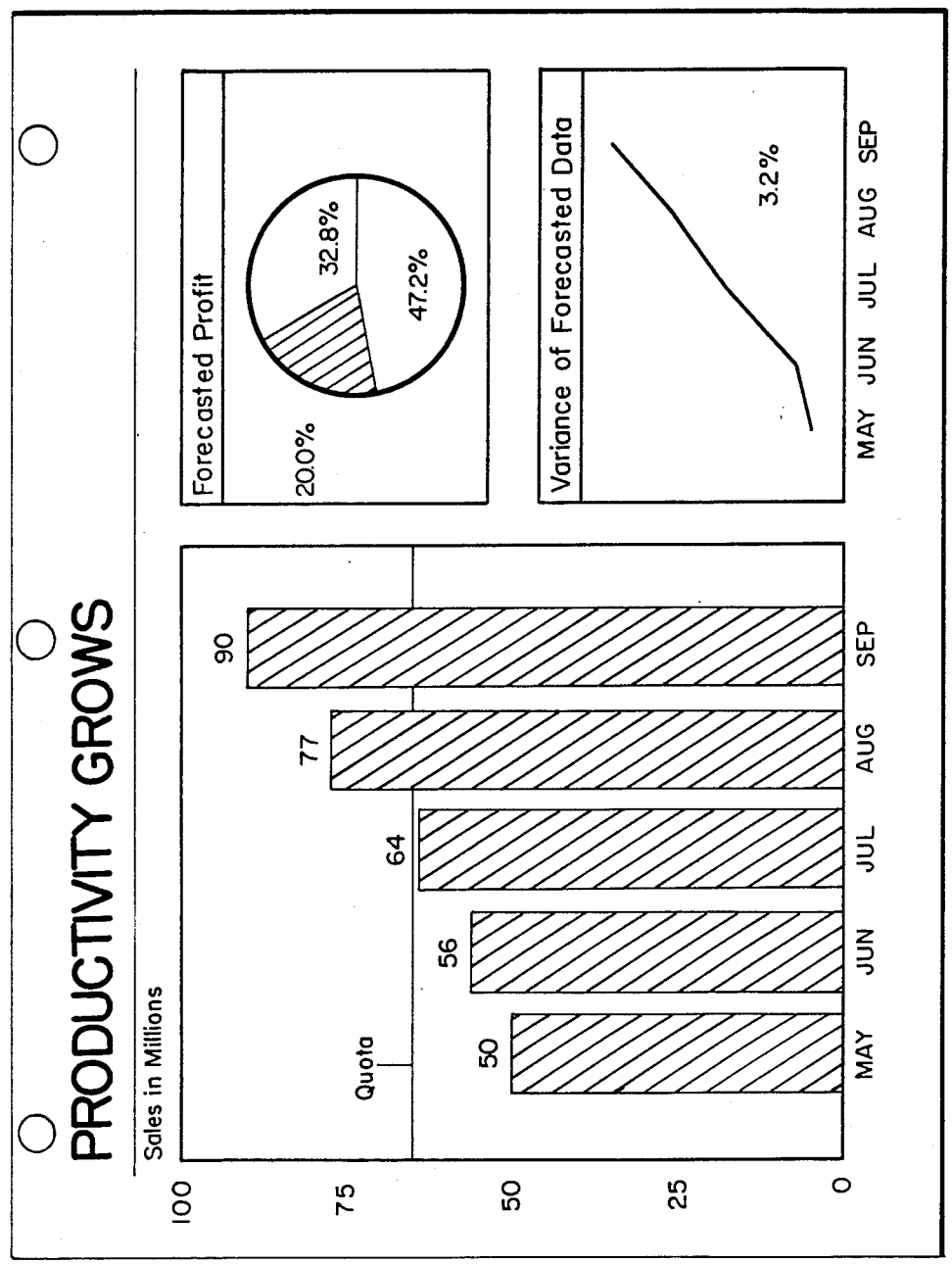
FIG. 1 is an illustration of a graph layout that includes three related graphs.

See, for example, FIG. 1 in which graphs 7, 8, and 9 are each defined by a respective SUBLAYOUT value.

TABLE I

| CONTROL PARAMETER: LAYOUT | |
|---|---|
| VALUES | CORRESPONDING GRAPH LAYOUT |
| SLIDE | 35 mm slide layout |
| VUGRAPH | standard viewgraph transparency |
| CRT | typical video display terminal (vdt) |
| PC | low resolution vdt |
| VERTICAL REPORT, HIGH QUALITY (VREPH) | high resolution graph on standard 8.5" × 11" (or vertical A4) page |
| VREPL | low resolution graph on 8.5" × 11" (or vertical A4) page |
| HORIZONTAL REPORT, HIGH QUALITY (HREPH) | high resolution graph on standard 11" × 8.5" (or horizontal A4) page |
| HREPL | low resolution graph on 11" × 8.5" (or horizontal A4) page |

TABLE II

Figures 6A, 6B, 6C, 6D:
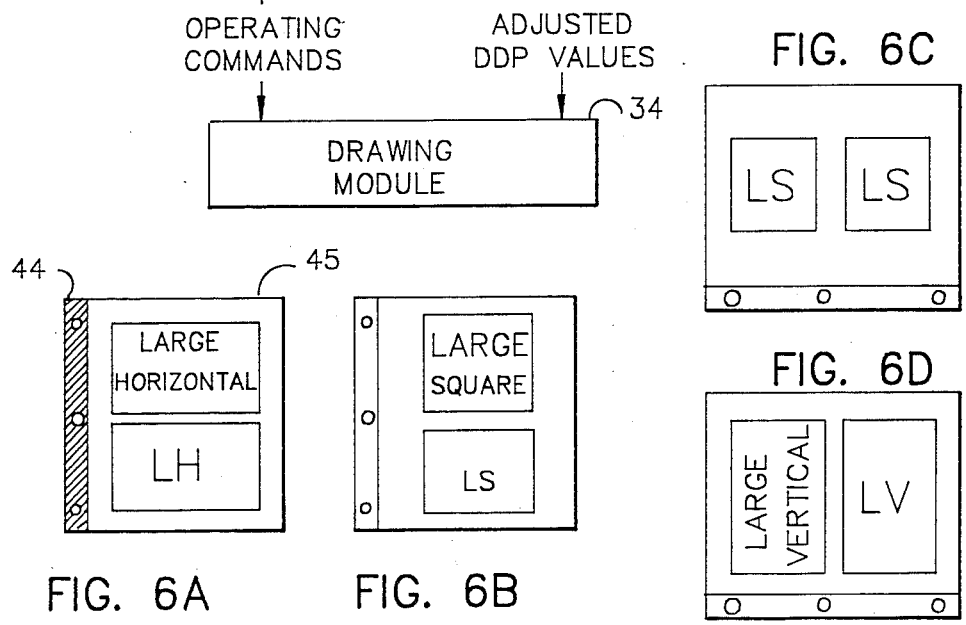

| CONTROL PARAMETER: SUBLAYOUT | |
|---|---|
| VALUES | CORRESPONDING GRAPH SUBLAYOUT |
| FULL | Table I value unaltered |
| LARGE HORIZONTAL (LH) | Proportional reduction from horizontal 11" × 8.5" (or A4) page to fit on standard vertical 8.5" × 11" (or A4) page (FIG. 6A). Retains aspect ratio of HREP and permits a maximum of 2 LH graphs per vertical page. |
| SMALL HORIZONTAL (SH) | Retains standard aspect ratio of HREP, but reduced to fit up to 4 SH graphs per horizontal page (FIG. 6H). |
| LARGE VERTICAL (LV) | Proportional reduction from vertical 8.5" × 11" (or A4) page to fit on |

TABLE II-continued

| CONTROL PARAMETER: SUBLAYOUT | |
|---|---|
| VALUES | CORRESPONDING GRAPH SUBLAYOUT |
| | standard horizontal 11" × 8.5" (or A4) page (FIG. 6B). Retains aspect ratio of VREP and permits a maximum of 2 LV graphs per vertical page. |
| SMALL VERTICAL (SV) | This sublayout retains the standard aspect ratio of VREP, but reduced to fit up to 4 SV graphs per vertical page (FIG. 6G). |
| SQUARE (LS) or (SS) | These sublayouts adjust the aspect ratios of VREP or HREP layout values to a layout having a large square (LS) aspect ratio or a small square (SS) aspect ratio. FIGS. 6B, 6C, 6F, 6J, and 6K illustrate how two LS and up to six SS sublayouts can fit onto vertical or horizontal reportsized pages. |
| SMALL SLIDE (SSLIDE) | The SSLIDE sublayout adjusts the SLIDE layout of Table I by reducing it in size. Three or four SSLIDE sublayouts can be placed on a report page, as a useful accompaniment to a slide presentation (FIGS. 6E and 6H). |

In the method of the invention, selection of a SUBLAYOUT value will automatically adjust a corresponding LAYOUT format. In this regard, for all of the SUBLAYOUT values except the SQUARE values, the aspect ratios are preserved, while the layout dimensions are scaled down. In the case of text that appears in a graph title, in axis legends, or otherwise, the inter-character spacing is adjusted, leaving the text at its optimum size readability.

By default, the SUBLAYOUT graphs invoked by the values in Table II are drawn near the center of a page or designated plotting area. In order to adjust the position of a sublayout, or to draw more than one sublayout on a page, a control parameter SUBLAYOUT POSITION is provided, having the values listed in Table III.

TABLE III

| CONTROL PARAMETER: SUBLAYOUT POSITIONS |
|---|
| CT (for the center of the page) |
| TOP LEFT |
| TOP CENTER |
| TOP RIGHT |
| BOTTOM LEFT |
| BOTTOM CENTER |
| BOTTOM RIGHT |
| LEFT CENTER |
| RIGHT CENTER |

When layouts corresponding to the VREP or HREP control parameters in Table I are invoked, a margin is left on one side of the page bearing the plotted graph so that the page can be bound into a report without obscuring any part of a plot. The margin is indicated in FIG. 6A by the shaded area 44 of the vertical report page 45. As will be evident, the margin 44 is a conventional lefthand margin. A MARGIN control parameter is provided in the method of the invention to permit placement of the margin 44 on the alternative vertical side of the page 45, to accommodate doublesized printing or copying, for example. As in FIG. 1, on a horizontally-oriented report page, the margin is provided along the top border of the page, providing an area for providing holes used to bind the page.

The two values of the MARGIN control parameter are NORMAL and REVERSED. When MARGIN is NORMAL a graph is drawn on a vertical page having a left-hand side margin or on a horizontal page having a top margin. When MARGIN is REVERSED, the margin is provided on the right-hand side of a vertical, and the bottom edge of a horizontal page.

A design control parameter CENTIMETER has two values: ON or OFF. If the CENTIMETER value is ON, the absolute width and height of a page upon which a graph is to be laid out are specified in metric as are the origin, length, and height of the X and Y axes, the horizontal and vertical positions and height of the title and of the axis legends and the height of any specified annotation characters in the graph. Furthermore, when CENTIMETER is on, the VREP and HREP layouts are defined by DDP values corresponding to the (metric) dimensions of the vertical or horizontal A4 page, as is standard in Europe. When CENTIMETER is not selected by a user (OFF) all affected DDP values (including those defining the VREP and HREP layouts) are in inches.

The method of the invention also provides a control parameter SEQUENCE TABLE, whose values are listed in Table IV.

TABLE IV

| CONTROL PARAMETER: SEQUENCE TABLE | |
|---|---|
| VALUES | FUNCTION |
| FULL COLOR DEVICES | |
| SPRING | Each selects a predetermined |
| SUMMER | sequence of colors keyed to a |
| FALL | predominant mood for designated |
| WINTER | season. |
| PURPLE | Each selects a predetermined |
| YELLOW | sequence of shades of designated |
| ORANGE | color. |
| LIGHTRED | |
| DARKRED | |
| BLUE | |
| COLOR | Selects a predetermined sequence of vibrant colors particularly suited to 35 mm slide display. |
| NEUTRAL | Each selects a predetermined |
| WARM | sequence of colors keyed to the |
| COOL | designated mood. |
| EIGHT COLOR DEVICES | |
| COLOR 8 | Selects a predetermined sequence of six drawing colors plus a foreground color and a background color. Shading patterns are chosen that emphasize the quality of graph appearance, but which require a long time to draw. |
| COLOR 8Q | Same as COLOR 8 except that the six colors are line-shaded according to a predetermined sequence of shade patterns that emphasizes speed of drawing. |
| FOUR COLOR DEVICES | |
| COLOR 4 | Selects predetermined sequence of four colors with shading patterns that are chosen to emphasize the quality of graph appearance, but which require a long time to draw. |
| COLOR 4Q | Same as COLOR 4 except that the four colors are line-shaded according to a predetermined sequence of shade patterns that emphasizes speed of drawing. |

TABLE IV-continued

| CONTROL PARAMETER: SEQUENCE TABLE | |
|---|---|
| VALUES | FUNCTION |
| | OTHER DEVICES |
| BW | Selects a predetermined series of shade patterns, line types and symbols for monochrome devices that emphasize graph quality, but which require a long time to draw. |
| BW QUICK | Same as BW but emphasis is on patterns, lines, and symbols that are quickly drawn. |
| GRAY | Selects a predetermined sequence of various shades of gray for monochrome devices with gray scale capability. |

Each COLOR SEQUENCE value listed in Table IV selects a predetermined sequence of colors and shade patterns for particular groups of output devices, with each output device group pertaining to devices having generally common color capabilities. For example, the SEQUENCE TABLE values SPRING, SUMMER, FALL, and WINTER pertain to full color devices such as color CRT's and 35 mm slide printers. Typical 8-color devices include pen plotters and color printers. Some pen plotters have 4-color capability; some can only draw monochrome graphs. The sequences pertainin to monochrome devices and gray scale devices can also determine the color and shading layout of monochrome CRT's and printers.

The SEQUENCE TABLE values provide color sequences that specify respective sets of colors to be used on the different curves of a multi-curve graph, the slices of a pie chart, the areas of an area chart, and the bars of a bar chart. In other than the full color devices, certain of the SEQUENCE TABLE values also provide for selection of predetermined sequences of shade patterns.

The set of DDP values that are determined by selection of a SEQUENCE TABLE value include the colors of the graph background, title, X axis, Y axis, frame, and annotation. For each curve in a graph, the SEQUENCE TABLE value specifies the line color, line texture, symbol type, shade pattern, and shade texture. For pie-type graphs, the shade color, shade pattern, and shade texture for each pie slice is determined by a SEQUENCE TABLE value. For a bar chart, the SEQUENCE TABLE value determines the shade color, shade pattern, and shade texture for each bar in the chart.

For graph annotation, a TEXT TYPE control parameter has a FANCY or a SIMPLE value to determine the text type of all annotation characters in a graph. A TEXT STYLE control parameter permits the designation of the style for all annotation on a graph. For example, the TEXT STYLE parameter can have the value of SERIF or SWISS LIGHT for selection of the corresponding text styles.

A control parameter CHECKOUT has values 0 and 1 and corresponding functions that are explained below.

A DRAWING ORDER control parameter having a value from 0 to 2, inclusive, is also provided in the method of the invention. The control parameter DRAWING ORDER specifies the type of output device being used: 0 specifies a vector device, 1 a raster device without area fill capability, and 2 a raster device with area fill. The DRAWING ORDER alters the order in which an output device is driven by its associated output device driver in order to take advantage of the device's hardware drawing capabilities.

On a vector device or a raster device without hardware fill, bar charts and linear plots are drawn from front to back, using software blanking.

On a conventional raster output device with hardware fill, the page background on which a graph is to be drawn is first drawn, followed by the graph plot background. Next, grid lines are drawn, then, axes, curves, bars, and a frame enclosing the graph plot. Finally, annotation background and annotations are drawn. On vector output devices and raster output devices without hardware fill, the order of background drawing is reversed and software blanking is used.

Finally, a control parameter GRAPH TYPE has the following values: LINE CHART, PIE CHART, AREA CHART, VERTICAL BAR CHART, and HORIZONTAL BAR CHART. Each of the GRAPH TYPE values determines the placement of the graph title and access legends, X and Y axis scaling, and the general form of the graph.

Although prior art systems afford a user the selection of a graph type to be produced, the graph type selection is not a parameter that can be used in combination with other high level design control parameters to afford the user arbitrary selective control over graph layout. In contrast, the method of the invention treats graph design as one of a set of high level design control parameters whose members can be selectively manipulated by a user to control layout design.

The method of the invention associates with each control parameter one or more sets, each containing one or more detail design parameters whose values are determined by the selected control parameter value. Table V lists, for each control parameter, one or more of the detail design parameters whose values are affected by the value of a control parameter. It is to be understood that Table V completely specifies every DCP included in the method of the invention, but lists only representative DDP's for many of the control parameters.

TABLE V

| DESIGN CONTROL PARAMETERS | AFFECTED DETAIL DESIGN PARAMETERS (samples) |
|---|---|
| LAYOUT | PAGE WIDTH, PAGE HEIGHT, X AXIS ORIGIN, LENGTH, HEIGHT, Y AXIS ORIGIN, LENGTH, HEIGHT, TITLE HOR POS, VERT POS, HEIGHT, CURVE THICKNESS, FRAME THICKNESS, LEGEND HOR POS, VERT POS, HEIGHT, SOURCE WINDOW, DEST. WINDOW ... |
| SUBLAYOUT | X AXIS ORIGIN, LENGTH, HEIGHT, Y AXIS ORIGIN, LENGTH, HEIGHT, TITLE HOR POS, VERT POS, HEIGHT, ... |

TABLE V-continued

| DESIGN CONTROL PARAMETERS | AFFECTED DETAIL DESIGN PARAMETERS (samples) |
|---|---|
| SUBPLOT POSITION | DESTINATION WINDOW |
| MARGIN | DESTINATION WINDOW (ONLY IF LAYOUT IS HREPH, HREPL, VREPH, or VREPL. |
| CENTIMETERS | PAGE WIDTH, PAGE HEIGHT, X AXIS ORIGIN, LENGTH, HEIGHT, Y AXIS ORIGIN, LENGTH, HEIGHT, TITLE HOR POS, VERT POS, HEIGHT, ANNOTATION CHARACTER HEIGHT, LEGEND HOR POS, VERT POS, HEIGHT, SOURCE WINDOW, DEST. WINDOW ... |
| SEQUENCE TABLE | PAGE BACKGROUND COLOR, TITLE COLOR, X AXIS COLOR, Y AXIS COLOR, FRAME COLOR, ANNOTATION COLOR; LINE COLOR, LINE TEXTURE, SYMBOL TYPE, SHADE COLOR, SHADE PATTERN, SHADE TEXTURE FOR EVERY CURVE; SHADE COLOR, SHADE PATTERN, SHADE TEXTURE FOR EACH PIE SLICE; SHADE COLOR, SHADE PATTERN, SHADE TEXTURE FOR EVERY SET OF BARS; ... |
| TEXT TYPE | ALL ANNOTATION |
| TEXT STYLE | ALL ANNOTATION |
| CHECKOUT | ALL ANNOTATION |
| DRAWING ORDER | METHOD OF AREA FILL, PAGE BACKGROUND, PLOT BACKGROUND, ANNOTATION BACKGROUND, OUTLINE DRAWING, METHOD OF BLANKING |
| GRAPH TYPE | TITLE PLACEMENT, LEGEND PLACEMENT, LEGEND CONTENTS, Y AXIS SCALING, X AXIS SCALING, DATA CONTENT REQUIREMENTS |

The affected DDP's in Table V will be evident to the skilled graphic process practitioner from their names. Thus, the X axis origin affected by the LAYOUT and SUBLAYOUT control parameters is the actual location on the output medium of the selected output device where the X axis of a line graph would originate. The terms "source window" and "destination window" are used in their usual sense of denoting how the graphical object created by the graphics process is to be converted into the appropriate coordinates of the selected output device. The term source window defines, in inches (or centimeters if CENTIMETER is on), a rectangular area on the graph whose boundaries are determined by minimum and maximum values of its four corner coordinates. Whatever is contained in the defined rectangle is scaled to fit in the destination window, which is the defined viewing area on the output medium where the graph is to be viewed. By default, both the source and destination windows are the same as a full page used for selected layout less margin when applicable.

The value ultimately selected for each DDP is of a conventional form. Thus, the length of the Y axis will have a value in inches (or centimeters if the CENTIMETER DCP is on). Similarly, DDP values for page background color will consist of a form of color specification.

For efficient retrieval of detail design parameter values, many of the values are stored in conventional lookup table format in the design database. For example, FIG. 7A illustrates an exemplary two-dimensional lookup table in the design database 19. The lookup table is indexed by $DCP_i$ with the values that $DCP_i$ can assume, $DCP_{i1}-DCP_{ij}$, listed in the left-hand column of the table. Each value of $DCP_i$ heads a row comprising a list or string of specific values of detail design parameters such as $DDP_1-DDP_n$. Thus, when $DCP_i$ is selected, it indexes the FIG. 7A table and the DDP values listed under the specific value of $DCP_i$ are obtained.

The skilled artisan will recognize that lookup tables can be made multi-dimensional. Thus in FIG. 7B, a series of lookup tables are illustrated, each associating particular sets of values for $DDP_i$ through $DDP_n$ with the values assumable by $DCP_a$. Each table is indexed by a respective one of the values assignable to $DCP_b$, that is, $DCP_{b1}-DCP_{bn}$. Thus, to retrieve any set of values for $DDP_i-DDP_n$ from a table in FIG. 7B, respective values mu assigned to $DDP_a$ and $DDP_b$.

The method of the invention responds to the design control parameters explained in detail above by accessing the design database 19 in an orderly fashion to obtain detail design parameter values from the database for the production of a graph in a layout that is controlled at a high level by a user of a graphics design system. The detali design process module 40 embodies a procedure for systematically choosing low-level detail design parameter values in response to high-level design control parameters. The procedure embodied in the detail design process module 40 is illustrated in generally ascending detail by FIGS. 8–12.

In the method of the invention, a set of DDP's are set to predetermined values by means of a process fragment 50 that includes a process step 52. Viewed differently, the process fragment 50 "selects" a respective value for each of a set of DDP's. In the process step 52, a specific DDP value is selected from the database 19 in response to a decision 54. The decision 54 questions whether the specific detail parameter, $DDP_i$, has been preset by the user. As explained above, if preset by the user, the value for $DDP_i$ will have been input by the user to the detail design process module 40. If the value of $DDP_i$ has not been preset, the negative exit will be followed from decision 54, and a predetermined value obtained from a current lookup table.

The process fragment 50 next enters a process step equivalent in all respects to the process step 52 except that the value of another detail parameter, $DDP_j$, is selected. In fact, the process fragment 50 consists of a series of steps, each equivalent to step 52, that selects the values for the design parameters $DDP_i-DDP_n$.

As shown in FIG. 9, the FIG. 8 process fragment is used in a higher level-process fragment 56 to set values for the detail parameter group including the parameters $DDP_i-DDP_n$ in response to selection of a value for a control parameter $DCP_i$. The process fragment 56 is invoked by the method of the invention to select values for a set of detail parameters that are affected by only one control parameter $DCP_i$. For example, the SEQUENCE TABLE parameter value is the sole determinant of color for all graph annotation.

Referring now to FIG. 9, the process fragment 56 is entered and initially encounters a decision 58 that tests the value of $DCP_i$. Assuming that $DCP_i$ has been set by the user to VALUE 1, the positive exit from decision 58 is followed and the values for the detail parameter set $DDP_i-DDP_n$ are selected in a step 50 equivalent to fragment 50. The procedure step moving from the decision 58 through the procedure step 50 corresponds essentially to a table lookup operation. Referring once again to FIG. 7, if $DCP_i$ has a value of 1, then default values for the set of affected detail parameters can be obtained from the first row of Table I. Of course, the process step 50 provides, as explained above, for any particular value of the set to be predetermined by a user input.

Assuming that $DCP_i$ is set to other than VALUE 1, a particular set of DDP values will be selected in the manner just described for any of the remaining $N-1$ values that $DCP_i$ can take on. Note that the bottommost detail value step 50 can provide for assignment of values to the detail parameter set in the event that no value has been selected for $DCP_i$, therefore providing for the default assignment of values to the detail parameter set.

It should be evident that the process fragment 56 provides for the assignment of values to an arbitrary set of DDP's taken in any arbitrary order.

FIG. 10 illustrates how the fragment 56 can be concatenated with identical fragments to set values for respective sets of DDP's that are affected by respective DCP's.

Figure 11:
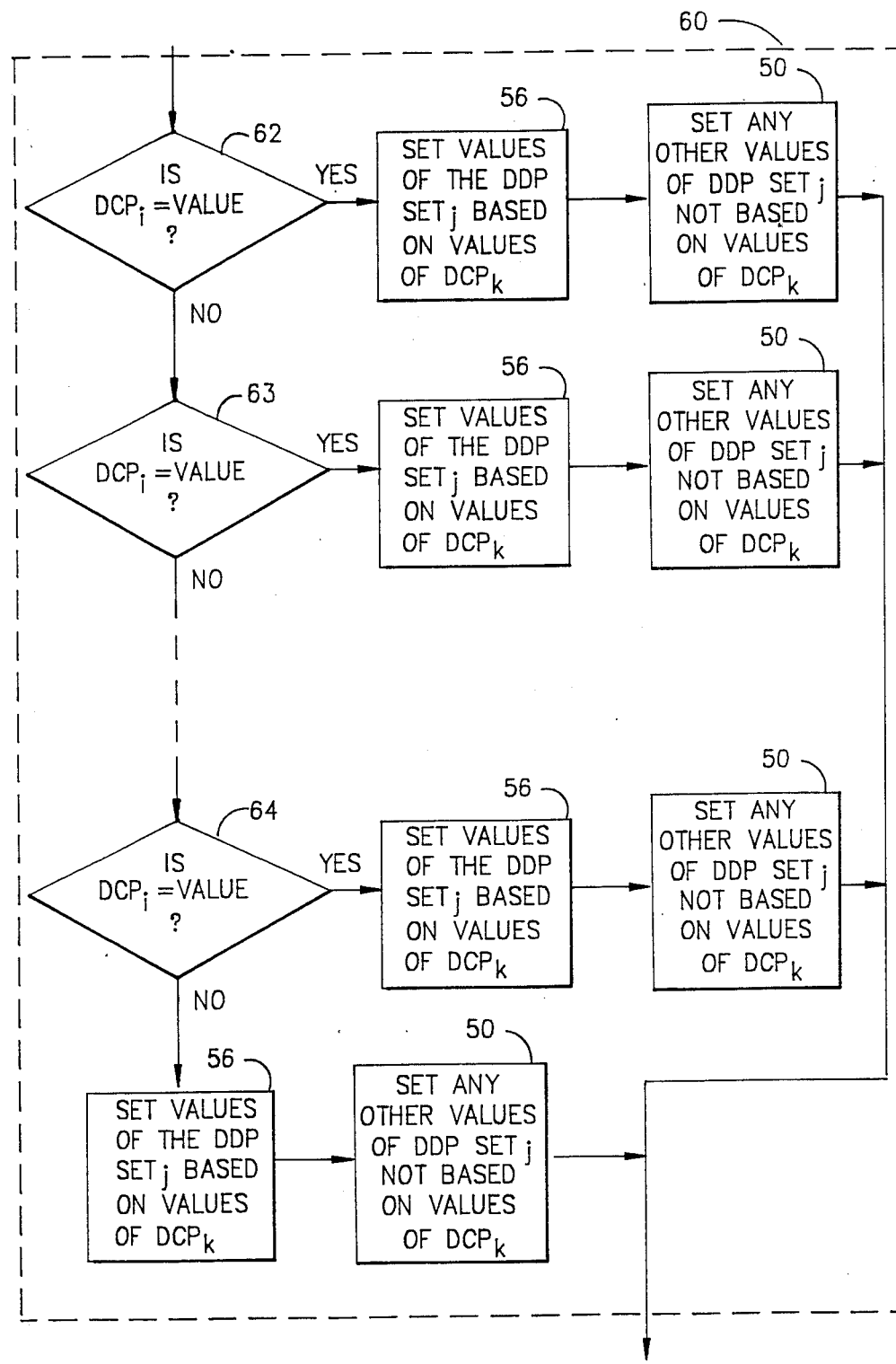
FIG. 11 illustrates how the method of the invention sets detail design parameters that depend upon more than one design control parameter.

In the event that a detail parameter value depends upon more than one control parameter, as in the case of the X-axis origin which depends upon the value of LAYOUT and MARGIN, the process fragment 60 of FIG. 11 is used by the method of the invention. The process fragment 60 is useful for establishing the values of a group of DDP's in DDP $SET_j$ that are based on values of $DCP_i$ and $DCP_k$. The process fragment 60 determines the values of $SET_j$ by branching from the main process path if the value of $DCP_i$ corresponds to one of the values in decisions 62-64. For any of the values of $DCP_i$ tested for in decisions 62-64, the process fragment 60 first sets the values of $SET_j$ based on the value of $DCP_k$ in a process step equivalent essentially to the process step 56 illustrated in FIG. 9 and explained hereinabove. After setting the values of $SET_j$ that are based on the value of $DCP_k$, the remaining values of $SET_j$ not based on the values of $DCP_k$, yet dependent upon the value of $DCP_i$, are set.

The instances of any of the steps 50 setting the values of DDP's that depend upon only the value of $DCP_i$ and not on the value of $DCP_j$ are not necessary as they may be set by a process step for $DCP_i$ equivalent to step 56 that is not included in step 60. In the preferred embodiment, however, step 50 is included in fragment 60 so that the values of $DCP_i$ do not have to be tested again.

The process fragment of FIG. 60 is an implementation of a multi-dimensional lookup table operation. While other implementation will be evident to the skilled designer, the structure of fragment 60 may be generalized to any depth by replacing step 56 in fragment 60 by another step that is essentially equivalent to fragment 60 itself. A multidimensional table lookup based upon the process fragment 60 is invoked, for example, in the case of setting a value for the DDP corresponding to an X-axis origin based on the assignment of values SUBLAYOUT, MARGIN, and CENTIMETERS.

Figures 12, 13:
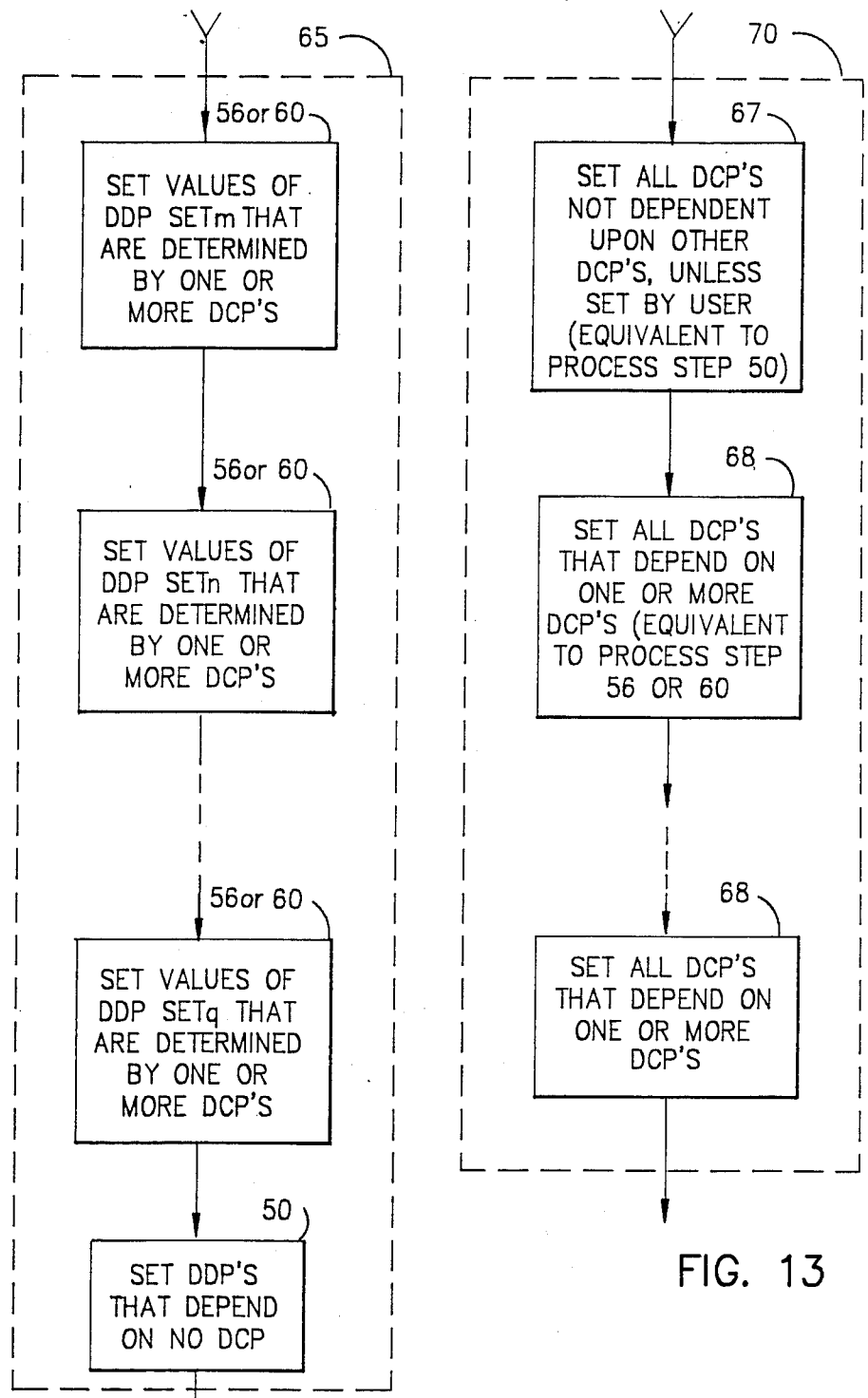
FIG. 12 illustrates the setting of detail design parameters based upon selected design control parameters with both single and multiple dependencies.
FIG. 13 illustrates setting default values for design control parameters that are dependent upon values of one or more other design control parameters.

FIG. 12 illustrates how the whole population of DDP's can be separated into respective sets in which the values of set members are selected. Most DDP sets are determined by a process step equivalent to process step 36 or 60 of FIG. 9 or 11, and a series of such process steps are performed in sequence to establish values for $SET_m-SET_q$.

In the preferred embodiment, no DDP is contained in more than one of the DDP sets, and therefore no DDP is determined by more than one of the steps of FIG. 12. Further, while it would be possible to structure a multidimensional lookup table so that no DCP would be involved in more than one step of FIG. 12, this is not required to practice the method of the invention.

Turning now to FIG. 13, the process of setting control parameter values will be explained. In FIG. 13 a process fragment 70 includes a first process step 67 in which all control parameters not dependent upon other control parameters are automatically set unless they have been set by a user. Process step 67 is, then, essentially equivalent to process step 50 of FIG. 8.

In the preferred embodiment, the values of the following DCP's are not dependent upon the values of other DCP's and therefore have their values set in process step 67: GRAPH TYPE, SUBLAYOUT, SUBLAYOUT POSITION, CHECKOUT, MARGIN, CENTIMETER, and TEXT TYPE.

Following the valuation of the independent DCP's in step 67, a sequence of steps 68 sets all other DCP values. Each of the concatenated steps 68 is equivalent to either process step 56 or process step 60. The steps 68 which are equivalent to process step 56 set the values of DCP's that are dependent upon only one other DCP. Of course, those of the steps 68 that are equivalent to process step 60 set values for DCP's that are dependent upon more than one DCP setting.

In the preferred embodiment, the following DCP's have values that depend upon the valuation of one or more other DCP's: SEQUENCE TABLE, LAYOUT, DRAWING ORDER, and TEXT STYLE. Means for implementing the value-setting functions of steps 67 and 68 are essentially equivalent to those described above for setting DDP values. Single- or multi-dimensional lookup tables having the basic format of the FIG. 7 lookup table can be constructed that permit the setting of DCP values based upon lookup index vectors that comprise the values of the DCP's upon which the object DDP whose value is to be set depends.

A well-known programming technique useful for setting DDP values is the nested conditional statement, which is used in the invention to perform table lookup operations. An example of a fragment of code consisting of a series of nested conditional statements, each implementing a partial table lookup, is given in Table VI.

TABLE VI

```
If LAYOUT is SLIDE then
    (Index TABLE of all DDP's common to all SLIDE
    layouts)
    If SUBLAYOUT is FULL then
        (Table lookup of all DDP's common to all
        FULL, SLIDE sublayouts)
    else if SUBLAYOUT is LARGE HORIZONTAL then
        (Table lookup of all DDP's common to all
        SLIDE sublayouts)
    else if SUBLAYOUT is SMALL HORIZONTAL then
        (TABLE lookup of all DDP's common to all
        SMALL HORIZONTAL SLIDE sublayouts)
else if LAYOUT is VIEWGRAPH then
    (Index Table of all DDP's common to all VIEWGRAPH
    layouts)
    if SUBLAYOUT is FULL then
        (Table lookup of all DDP's common to all
        FULL VIEWGRAPH layouts)
    else if . . .
else if . . .
```

The Table VI code listing implements the process fragment 60 of FIG. 11 in the form of a multiply-dependent DDP value-setting step. Here the set of DDP's that are dependent upon values for both LAYOUT and SUBLAYOUT are set. Thus, the first conditional statement tests the value of LAYOUT and, if the value is SLIDE, a positive exit is taken from the decision and the value of SUBLAYOUT is tested, with provision for table lookups for each value of SUBLAYOUT.

Figure 14:
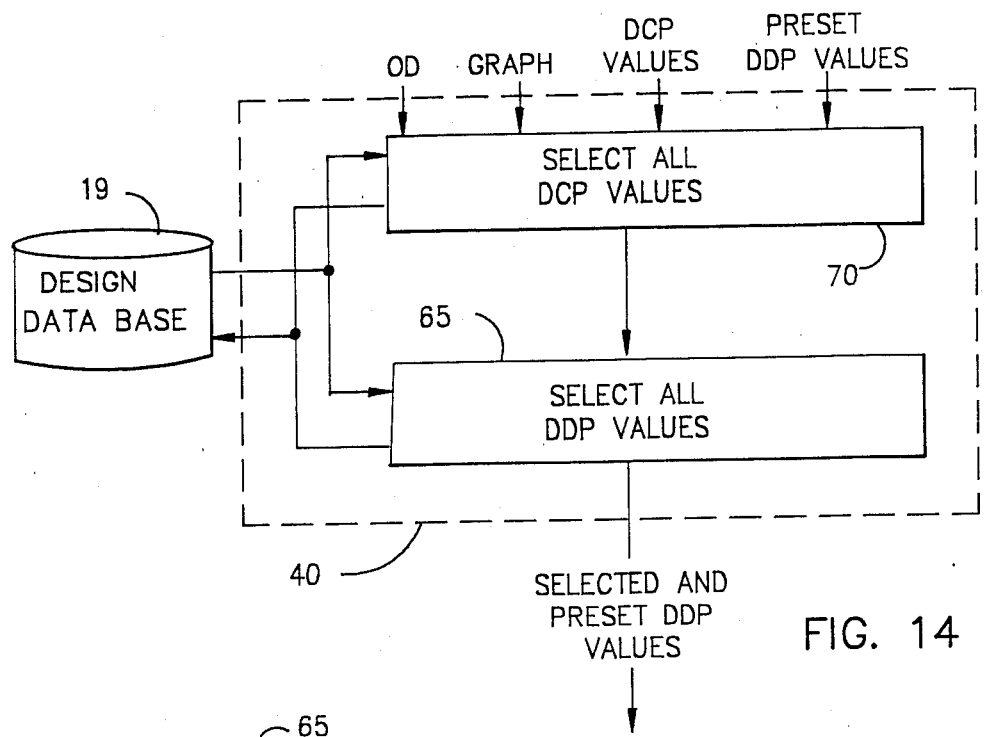
FIG. 14 illustrates the method of the invention at the highest level of abstraction incorporating the processes of FIGS. 8-13.

The method of the invention is expressed at the highest level in FIG. 14 where a first step equivalent to process fragment 70 sets all DCP values, which are entered by the user or stored, in table lookup form, in the database 19. Next, the DCP values are used to select the sets of DDP values that specify the layout desired by a user, with the DDP values selected by a step equivalent to fragment 65 of FIG. 12.

The invention further provides a preliminary view of a graph for its final production by a selected output device. Two previewing functions are described. The first previewing function is embodied in the CHECKOUT control parameter. The CHECKOUT parameter is useful when a user is designing the layout of an area chart graph, a bar chart graph, a pie chart graph, or a graph including significant amounts of text. The CHECKOUT parameter reduces drawing time and is advantageous for evaluating a graph before the graph is finally produced. When the user does not invoke CHECKOUT, it is assigned a value of 0 by step 70 in the process module 40. When its value is 0, the CHECKOUT parameter does not affect the value of any DDP. When CHECKOUT is preset by the user to a value of 1, it affects, after process step 65 of FIG. 14, the values of DDP's that determine text type, text style, and the texture of all lines drawn on a graph.

Figure 15:
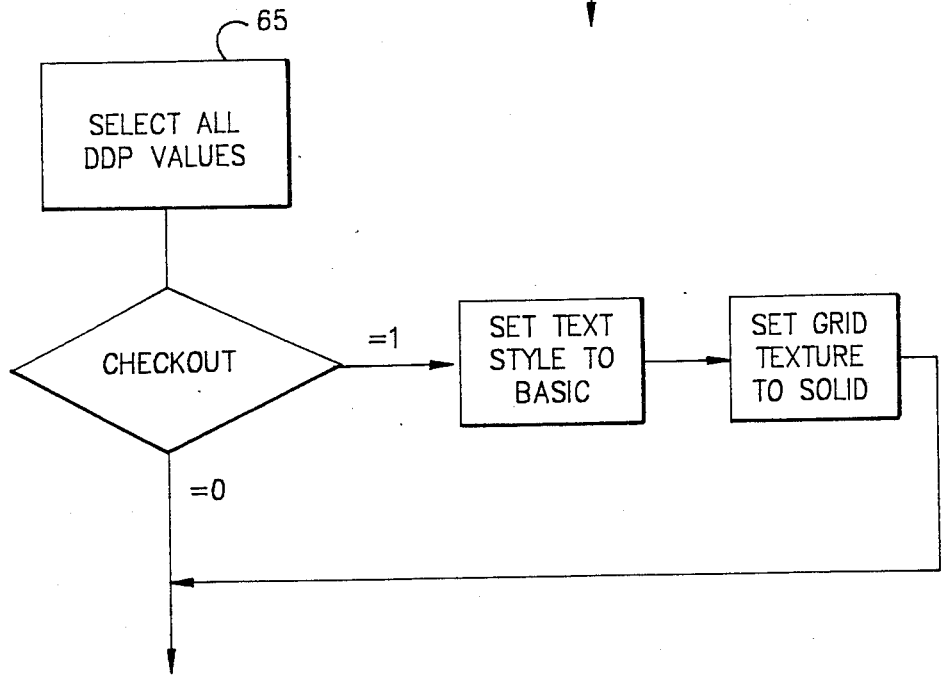
FIG. 15 illustrates a CHECKOUT procedure included in the invention.

Refer to FIG. 15 for an understanding of the CHECKOUT function. As shown in FIG. 15, the setting of a TEXT STYLE value determined in step 65 is overridden if CHECKOUT has been set equal to 1. In this case DDP values determining the style in which graph text is to be printed are set to values corresponding to the well-known BASE text style. Similarly, when CHECKOUT equals 1 text type DDP values are set to values corresponding to the well-known STANDARD text type, and grid texture DDP values are forced to values that produce solid lines.

It should be evident to the skilled graph designer that text in BASE style and STANDARD type and solid lines will result in a graph more quickly drawn than one having an exotic text style, a fancy text type, and a textured line pattern. Thus, with CHECKOUT set to a value of 1, a graph will be quickly produced by a selected output device, enabling the user to preview and evaluate the graph layout before final production.

Although not provided for in the method of the invention, it should be evident that the CHECKOUT parameter is used as a preview function in the context of a computer-implemented graphics system having provision for creating and saving data files. In this regard, any time that the user of a system such as the system of FIG. 2 wants to create an initial set of DDP values and then use DCP's to manipulate them during successive outputs of the graph in order to adjust graph layout features, it should be evident to the skilled user that a file of DCP values can be created and retained for so long as the user chooses. Then, the user can select a text style and type, a color sequence, and even specific values of DDP's determining these graph features during an initial graph design session and store and save those features during all outputs derived from the file, suppressing or overriding the DCP-determined text and line values when CHECKOUT is set, and permitting them to control the selection of affected DDP values when CHECKOUT is reset after an output. This will relieve the user from the burden of having to subsequently set previously-selected DCP or DDP values after he resets CHECKOUT.

Another preview feature implied by the method of the invention that has been implemented by the inventors in a graphics system is the ability to evaluate a layout design on an output device for which another layout is more suited. The control parameters LAYOUT and SUBLAYOUT permit a user to, for example, specify that a vertical page layout will be displayed for previewing on the CRT of a video output device in spite of the fact that the default layout selected for the video device would be a horizontally-oriented layout because of the typical aspect ratio of a CRT. Or, a user might specify a SLIDE layout to be produced on a page of 8.5×11 paper by a pen plotter in order to evaluate the graph layout on an inexpensive presentation medium before changing his output device selection to a slide generator.

Further, it will be evident to the skilled system designer that specific values for specific DDP's can be preset by a user in ways other than that afforded by the method of the invention. With reference to FIG. 5, it should be evident that a system design can provide for overriding DDP values in the signal path between the detail design process module 40 and the adaptation module 42. Alternatively, DDP values preset by a user can be used to override DDP values that are provided by the adaptation module 42 to the drawing module 34. Or, the skilled system designer might choose to afford a system user with the possibility of overriding DDP values both between the design process module 40 and the adaptation module 42, and between the adaptation module 42 and the drawing module 34. However, these alternatives to the contrary notwithstanding, the inventors have provided the method of the invention with the ability to override DDP values during the design process by preselection as illustrated in FIG. 8.

Obviously, other variations of the present invention are possible in light of the above teachings. It is therefore to be understood that within the scope of the appended claims, the invention may be practiced otherwise than as specifically described.

We claim:

1. A method for automatically determining the detailed layout of a graph having numerous detail design parameters (DDPs), each DDP representing a single attribute of the graph layout, in response to user selection of high-level design control parameters (DCPs), each DCP including a plurality of DDPs, in a system including:

input means for enabling a user to provide the system with a user-selected value for each of a complete set of DCPs;

a database for associating each user-selected value of each DCP provided through the input means with a predetermined set of DDP values;

memory means for storing, at an address associated with each DCP value, its associated set of DDP values;

selection means adapted to receive a user-selected DCP value from the input means and for selecting from the memory means, by reference to the database, the associated set of DDP values; and graphics process means for receiving the set of DDP values selected by the selection means from the memory means and converting the received set into graphical output primitives suitable for operating a graphics output device to produce on an output medium a graph having a layout determined by the set of DDP values; the method comprising the steps of:

(a) receiving from the input means user-selected values for members of the complete set of DCPs'
   (b) determining, in association with the database, the location in memory of the set of DDPs associated with each userselected DCP value;
   (c) selecting the set of DDPs from memory;
   (d) converting the selected set of DDPs into graphical output primitives for the output device; and
   (e) providing the primitives to the output device to cause it to produce a graph having the layout determined by the user-selected DCPs.

2. The method of claim 1 wherein the system further includes means for determining whether the user has selected a value for each member of the complete set of DCPs, and further comprising the steps of:

(f) automatically designating values for each member of the complete set of DCPs for which no user-selected values are received; and
   (g) determining, in association with the detabase, the location in memory of the set of DDPs associated with each automatically-selected DCP value; and
   (h) including these DDPs in the set of DDPs selected from memory.

3. The method of claim 2 in which the step of automatically designating values for DCPs for which no userselected values are received chooses values for certain DCPs which are dependent on user-selected values for one or more other DCPs.

4. The method of claim 1 wherein each of a number of sets of values of a group of DDPs are associated with respective values of a collection of DCPs in a multiply-dependent relationship and the selecting step comprises selecting one of the DDP value sets based upon respective designated values for the DCP collection.

5. The method of claim 1 wherein the step of receiving also includes receiving preselected values for respective DDPs and the step of selecting includes determining whether a value has been preselected for each DDP and assigning to a DDP the preselected value instead of a value which would otherwise be automatically selected.

6. The method of claim 1 wherein the DCPs include a CHECKOUT parameter having first and second values and wherein the system further includes means for detecting the value of the CHECKOUT parameter and causing the selection means to select different DDPs depending on the detected value, the method further including the steps of:

detecting when the user has selected the first value for the CHECKOUT parameter;
   overriding, in response to detection of the first CHECKOUT value, the values provided automatically by the database for predetermined DDPs affecting the speed with which the output device produces the graph; and
   substituting, for the predetermined DDPs, values which permit the selected output device to produce the graph faster than the automatically selected values.

7. The method of claim 6 wherein the overriding step occurs after the selection step.

8. The method of claim 1 wherein the DCPs include a LAYOUT parameter and the associating step includes associating with each value of the LAYOUT parameter DDP values defining graph layout attributes having a preselected dimensional relationship with the output medium.

9. The method of claim 1 wherein the DCPs include a SUBLAYOUT parameter and DDP values defining a plurality of graphs to be produced on the output medium are associated with a value of the SUBLAYOUT parameter.

10. The method of claim 1 wherein the DCPs include a SEQUENCE TABLE parameter and DDP values defining a color sequence for the graph are associated with a value of the SEQUENCE TABLE parameter.

11. A system for automatically determining the detailed layout of a graph having numerous detail design parameters (DDPs), each DDP representing a single attribute of the graph layout, in response to user selection of high-level design control parameters (DCPs), comprising:

input means for enabling a user to provide the system with a user-selected value for each of a complete set of DCPs'
   a database for associating each user-selected value of each DCP provided through the input means with a predetermined set of DDP values;
   memory means for storing, at an address associated with each DCP value, its associated set of DDP values;
   selection means adapted to receive a user-selected DCP value from the input means and for selecting from the memory means, by reference to the database, the associated set of DDP values; and
   graphics process means for receiving the set of DDP values selected by the selection means from the memory means and converting the received set into graphical output primitives suitable for operating a graphics output device to produce on an output medium a graph having a layout determined by the set of DDP values.

12. The system of claim 11 further including:
means associated with the input means for enabling a user to directly select values for particular DDPs;
means associated with the selection means for preventing it from selecting DDPs for attributes having values directly selected by the user; and
means associated with the graphics process means for enabling it to receive user-selected DDP values as well as DDP values selected by the selection means.

13. The system of claim 11 further including means for automatically designating values for DCPs for which no userselected values are received.

14. The system of claim 13 wherein the means for automatically designating values for DCPs for which no user-selected values are received includes means responsive to user-selected values for one or more other DCPs for choosing the automatically designated values.

* * * * *